(12) United States Patent
Diao et al.

(10) Patent No.: US 7,565,655 B2
(45) Date of Patent: Jul. 21, 2009

(54) METHODS AND SYSTEMS FOR CONTROL DISCOVERY IN COMPUTING SYSTEMS

(75) Inventors: Yixin Diao, White Plains, NY (US); Frank N. Eskesen, Saugerties, NY (US); Steven E. Froehlich, Danbury, CT (US); Joseph L. Hellerstein, Ossining, NY (US); Alexander Keller, New York, NY (US); Lisa F. Spainhower, Highland, NY (US); Maheswaran Surendra, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 915 days.

(21) Appl. No.: 10/688,742

(22) Filed: Oct. 17, 2003

(65) Prior Publication Data

US 2005/0086645 A1 Apr. 21, 2005

(51) Int. Cl.
*G06F 9/46* (2006.01)
(52) U.S. Cl. .................................. 718/104
(58) Field of Classification Search .................. 718/104
See application file for complete search history.

(56) References Cited

U.S. PATENT DOCUMENTS

| | | | |
|---|---|---|---|
| 5,815,712 A | 9/1998 | Bristore et al. | |
| 5,845,283 A * | 12/1998 | Williams et al. | 707/101 |
| 5,867,382 A | 2/1999 | McLaughlin | |
| 6,076,174 A * | 6/2000 | Freund | 714/47 |
| 6,298,448 B1 | 10/2001 | Shaffer et al. | |
| 6,314,463 B1 * | 11/2001 | Abbott et al. | 709/224 |
| 6,445,963 B1 | 9/2002 | Blevins et al. | |
| 6,859,784 B1 * | 2/2005 | van Duyne et al. | 705/10 |
| 2002/0027569 A1 | 3/2002 | Manni et al. | |
| 2003/0208559 A1 * | 11/2003 | Velline et al. | 709/218 |

OTHER PUBLICATIONS

C. Lu et al., "Performance Specifications and Metrics for Adaptive Real-Time Systems," Proceedings of 21st IEEE Real Time Systems Symposium, Nov. 2000, pp. 13-24.
D.A. Menascé et al., "Preserving QoS of E-Commerce Sites Through Self-Tuning: A Performance Model Approach," Proceedings of the ACM Conference Electronic Commerce, Oct. 2001, 11 pages., Florida.
Y. Diao et al., "Using MIMO Feedback Control for to Enforce Policies for Interrelated Metrics with Application to the Apache Web Server," Proceedings of Network Operations and Management, 2002, 16 pages.
Y. Diao et al., "Generic On-Line Discovery of Quantitative Models for Service Level Management," Proceedings of the 8th IFIP/IEEE International Symposium on Integrated Network Management, Mar. 2003, 14 pages.
DMTF, "Common Information Model (CIM) Core Model," Version 2.4, White Paper, Aug. 30, 2000, pp. 1-54.

* cited by examiner

*Primary Examiner*—Meng-Ai An
*Assistant Examiner*—Mengyao Zhe
(74) *Attorney, Agent, or Firm*—Louis J. Percello, Esq.; Ryan, Mason & Lewis, LLP (57) ABSTRACT

Techniques are provided for generically controlling one or more resources associated with at least one computing system. In one aspect of the invention, the technique comprises evaluating one or more performance metrics associated with the one or more resources given one or more configurations of the one or more resources. The technique then causes a change in the one or more configurations of the one or more resources based on the performance metric evaluating step. The one or more performance metrics and the one or more configurations are expressed in generic formats.

20 Claims, 11 Drawing Sheets

METHODS AND SYSTEMS FOR CONTROL DISCOVERY IN COMPUTING SYSTEMS

FIELD OF THE INVENTION

The present invention relates to computing systems, and, more particularly, to techniques for control discovery in such computing systems.

BACKGROUND OF THE INVENTION

Enterprise level software, especially middleware, has tens to hundreds of configuration parameters. As one example, the DB2 Universal Database Server from IBM Corporation (Armonk, N.Y.) has approximately 40 performance related configuration parameters (e.g., bufferpool sizes, time delay for writing commits, maximum number of database applications). The problem of configuring and tuning these parameters compounds when operating systems and additional middleware products like HyperText Transfer Protocol (HTTP) Servers and Web Applications Servers are needed to provide a complete system.

These challenges are well recognized, as evidenced by efforts to address them such as IBM Corporation's autonomic computing initiative that is developing self-managing systems. In particular, addressing self-configuration and self-optimization often depends on subtleties in the workload and system configuration.

This motivates the need for a generic approach that discovers the performance impact of configuration parameters by interacting with a target system.

SUMMARY OF THE INVENTION

The present invention provides techniques for generically controlling one or more resources associated with at least one computing system.

In one aspect of the invention, the technique comprises evaluating one or more performance metrics associated with the one or more resources given one or more configurations of the one or more resources. The technique then causes a change in the one or more configurations of the one or more resources based on the performance metric evaluating step. The one or more performance metrics and the one or more configurations are expressed in generic formats.

The one or more resources may be real resources and/or virtual resources. The step/operation of evaluating the one or more generically-expressed performance metrics may further comprise determining whether one or more performance goals are being met based on the one or more generically-expressed performance metrics.

The technique may further comprise the step/operation of obtaining the one or more generically-expressed performance metrics from a probe. The probe may measure performance of the one or more resources in the context of a particular workload. The particular workload may be a current workload. The technique may further comprise the step/operation of obtaining the one or more generically-expressed performance metrics via one or more measurements of at least a part of an end user performance experience. The technique may further comprise the step/operation of obtaining the one or more generically-expressed configurations associated with the one or more resources prior to changing a configuration. Also, the one or more obtained, generically-expressed configurations may be categorized.

The step/operation of causing a change in the one or more generically-expressed configurations may further comprise building a model for use in determining changes in the one or more generically-expressed configurations. The model building step may comprise using at least one of a previous performance history and a previous configuration. The model building step may further comprise obtaining performance samples associated with the one or more resources and their one or more current configurations. The step/operation of causing a change in the one or more generically-expressed configurations may further comprise instructing the one or more resources to change one or more configurations associated therewith.

The technique may further comprise the step/operation of storing the one or more changed, generically-expressed configurations. Further, the one or more performance metrics and the one or more configurations may be expressed in generic formats in accordance with one or more common generic interfaces. A common generic interface may comprise a Common Interface Model (CIM).

Thus, advantageously, the present invention may provide a generic, online approach to optimizing resource configurations in a closed loop system. For example, the approach may use abstract models such as CIMs to discover metrics and configuration parameters and then modify those configuration parameters using the abstract models.

In another aspect of the invention, a method of providing a service for generically controlling one or more resources associated with at least one computing system comprises a service provider deploying a system operative to: (i) evaluate one or more performance metrics associated with the one or more resources given one or more configurations of the one or more resources; and (ii) cause a change in the one or more configurations of the one or more resources based on the performance metric evaluating step; wherein the one or more performance metrics and the one or more configurations are expressed in generic formats.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

It is to be understood that the present invention is not limited to any particular computing system environment. Rather, the invention is more generally applicable to any computing system environment in which it would be desirable to discover the performance impact of configuration parameters associated with one or more computing systems being monitored and controlled.

As used herein, the term "configuration" generally refers to settings of parameters that are needed for the operation of a system. This may typically include parameters that take numerical values (e.g., memory pool size, number of threads), and/or categorical values (e.g., query processing parallelism on/off), and/or connections to other resources (e.g., an index for a table in a database). These parameters can include the definition of the system and its' operation or tuning.

For convenience of reference, the remainder of the detailed description will be divided into the following sections: (1.0) Illustrative Generic Control System; (2.0) Illustrative Generic Control Methodologies; (3.0) Illustrative System Processes; (4.0) Illustrative Computer System; and (5.0) Service Provider.

1.0 Illustrative Generic Control System

Figure 1:
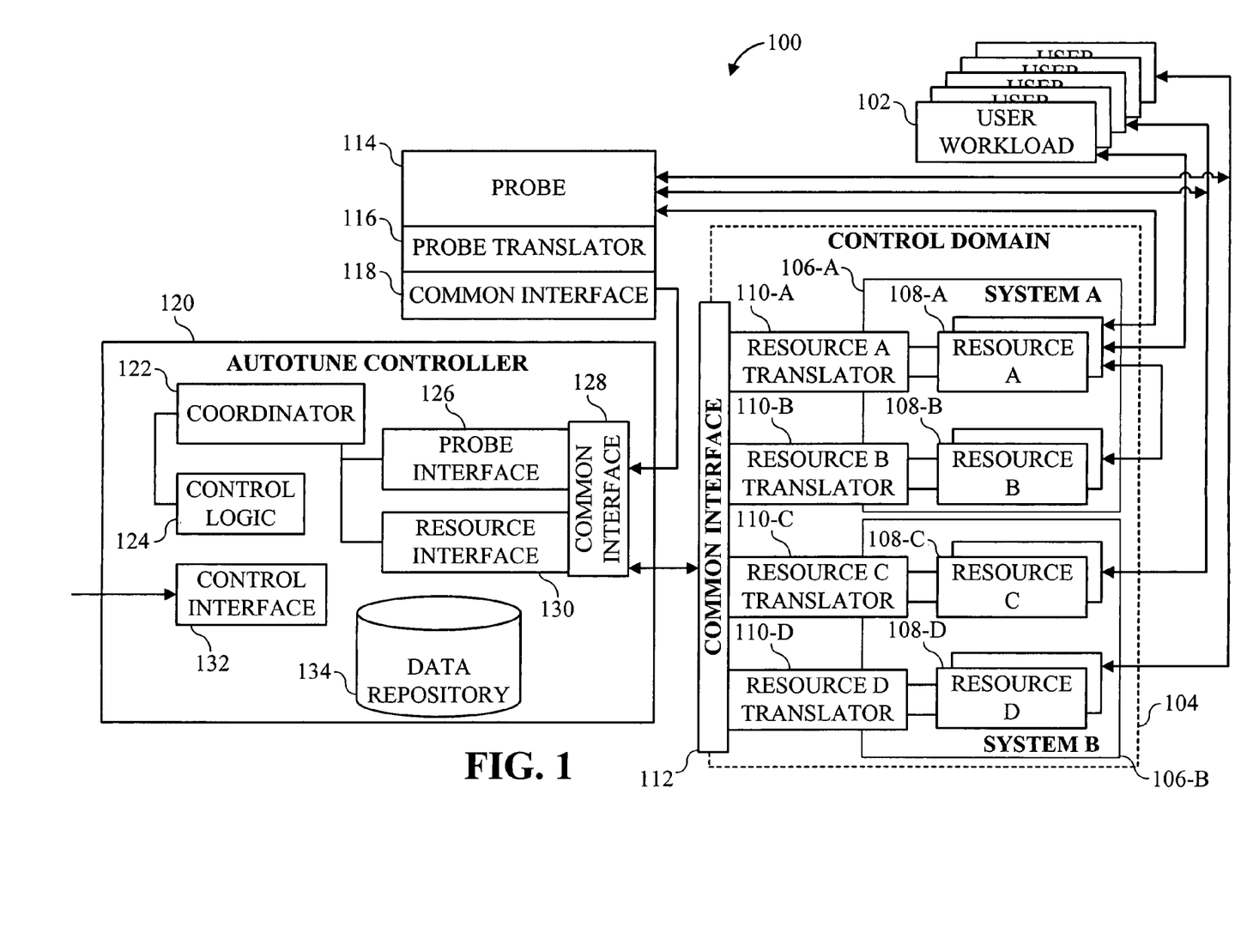
FIG. 1 is a block diagram illustrating an environment comprising a generic control system and computing systems with which the generic control system may be deployed, according to an embodiment of the present invention.

FIG. 1 is a block diagram illustrating an environment comprising a generic control system and computing systems with which the generic control system may be deployed, according to an embodiment of the present invention.

As shown in FIG. 1, environment 100 comprises user workload 102; control domain 104 including computing system 106-A which itself includes resource 108-A and resource 108-B, computing system 106-B which itself includes resource 108-C and resource 108-D, resource translators 110-A, 110-B, 110-C and 110-D, and common interface 112; probe 114; probe translator 116; common interface 118; and autotune controller 120 including coordinator 122, control logic 124, probe interface 126, common interface 128, resource interface 130, control interface 132 and data repository 134. It is to be understood that the invention is not limited to any particular number of control domains, resources, computing systems, probes or controllers. Also, the invention is not limited to the use of an "autotune" controller.

It is to be appreciated that the components shown in FIG. 1, other than the resources being controlled, may be generally referred to herein as a "generic control system."

The components of environment 100 interact and operate as follows.

Some form of user work (e.g., user workload 102) is being done by one or more resources on one or more systems (e.g., resources 108-A through 108-D on systems 106-A and 106-B). Examples of resources may include computing resources associated with a company payroll system, an airline reservation system workload, or a stock trading system. Also, the resources may be real and/or virtual resources. By way of example only, a virtual resource may be a virtual memory size or virtual thread as realized by software program, while a real resource may be the actual memory itself.

Workloads may include tasks that the particular systems perform. For example, workload coming from a user could be a transaction (such as placing an order in an e-commerce site) that has to be processed by a database. Thus, in such an example, the resources could be database objects which consume/occupy some physically constrained resource such as memory, disk space, etc. Examples of such resources in a database are bufferpools and tablespaces.

The time it takes to complete some unit of user work is measured by probe 114 either in measuring the actual user work or submitting some sample user work itself. Probe 114 reports the system performance through probe translator 116 that interprets the specific probe performance information and sends it in a generic format to controller 120.

Thus, examples of the performance reported via probe 114 may include response time to a query or transaction rate. This data may be genericized through a virtualization layer, and could be apparent to the controller as a tag-value pair. The controller could have a goal, which could be connected with the performance metric, e.g., maximize (such as throughput) or minimize (e.g. response time). Hence, the controller would not need to know the details of the particular performance metric, other than that it wants to maximize or minimize it.

It is to be appreciated that rather than a probe, other methods of determining at least some part of the end-user performance experience may be employed. For example, direct measurements of user transactions may be obtained, genericized, and then sent to controller 120.

The generic format being discussed here is the format of the data. So, for example, the response time may be the number of milliseconds stored in 32 bits as an integer, or it may be stored as seconds in 64 bits as a floating point number. The term generic is used here to show that the formatting does not have to be done the same way among different control systems, but within the same control system (or sets of common control systems) it should be presented to the control in the same format. Therefore, the approach provides flexibility and the system is not locked into one way of formatting the data.

Each resource that is being monitored for performance or controlled also has a resource translator (e.g., 110-A through 110-D) that can control the resource and express that control in a generic fashion common to all of the other controlled resources on this system or other systems within control domain 104.

For example, DB2 (IBM Corporation) has a specific way to modify the number of bufferpool page cleaner agents which is different from Oracle (Redwood Shores, Calif.), and both of which are different from Sybase (Dublin, Calif.). While all of these database managers have bufferpool page cleaner agents they have different controls that are specific to each database manager. So, the resource translator converts that database manager's specific format to a generic format so controller 120 can change the number of bufferpool agents without having to know if the database manager is DB2, Oracle or Sybase.

By way of further example, the specific expression of the number of bufferpool agents in a database is typically through an application programming interface (API) provided by the system/resource, or through an administrator's console or a specific scripting for a command line interface. The specific expression could be generically expressed through the virtualization layer/common interface (such as CIM) in approximately the following manner:

parameter:=controlKnob
name:=databaseInstanceName.database-
   Name.bufferPoolName
type:=integer
enabled:=true Controller 120 receives the input from probe 114 (via common interfaces 118 and 128) and resources 108-A through 108-D (via common interfaces 112 and 128) in a generic format. Probe interface 126 translates the generic information from probe 114 and expresses it in a controller-specific format. Probe interface 126 is thus the component of the controller that interfaces with probe 114, and keeps the history of the probe data in data repository 134. Resource interface 130 translates the generic information from the resources and expresses it in a controller-specific format. Resource interface 130 is thus the component of the controller that interfaces with all of the resources to be monitored and adjusted. The history of this data is also kept in data repository 134. Probe interface 126 and resource interface 130 may be jointly considered a "controller translator."

Thus, controller 120 may be considered another resource that understands a specific format for data and commands. Resource interface 130 also changes that specific format to a generic format that the other resource translators within the control domain understand.

Controller 120 then coordinates (via coordinator 122) the information from probe 114 and resources 108-A through 108-D and gives the information to control logic 124 to determine what changes should be made to the controlled resources. Control logic 124 makes those resource tuning decisions and requests the changes back through the generic interface (130, 128 and 112) to resource translators 110-A through 110-D which changes the settings on the specific resource. That is, resource interface 130 translates data from any controller-specific format to a generic format and passes the generically-expressed data through the common interface to the resource translators, which then respectively translate the data to resource-specific formats for use in changing resource configurations.

An example of control logic 124 in operation may be in the minimization of a response time (performance metric) for an e-commerce site, using the well-known Nelder-Mead, or direct search approach, see W.H. Press et al., "Numerical Recipes in C: The Art of Scientific Computing," Cambridge University Press, 2nd edition, January 1993, the disclosure of which is incorporated by reference herein. The optimizing control logic would look at the performance metric. The optimizing control looks at several past measurements of the performance metric at different buffer pool settings, and moves in a direction (of bufferpool sizes in a multi-dimensional space) that is anticipated to further optimize the performance metric.

Control interface 132 is used for control of the controller, and may normally be used by some human operator or some higher level controller. Data repository 134 keeps a copy (for some period of time) of the data collected by the controller in a persistent manner.

The following portion of the detailed description explains illustrative methodologies that provide a generic, online approach to optimizing resource configurations in a closed loop system, such as in environment 100 described above in the context of FIG. 1. The term "online" generally refers to the controlled resource or system being turned on, connected and able to be changed while running (by contrast, an "off-line" approach would be having to turn off the resource connection to the user workloads, or put the resource in a maintenance mode). Further, the illustrative approach may use abstract models such as the Common Information Models (CIMs) to discover metrics and configuration parameters and then modify those configuration parameters using the abstract models. However, the invention is not limited to such models. The methodologies will be described with reference to the components of FIG. 1.

2.0 Illustrative Generic Control Methodologies

Figure 2A:
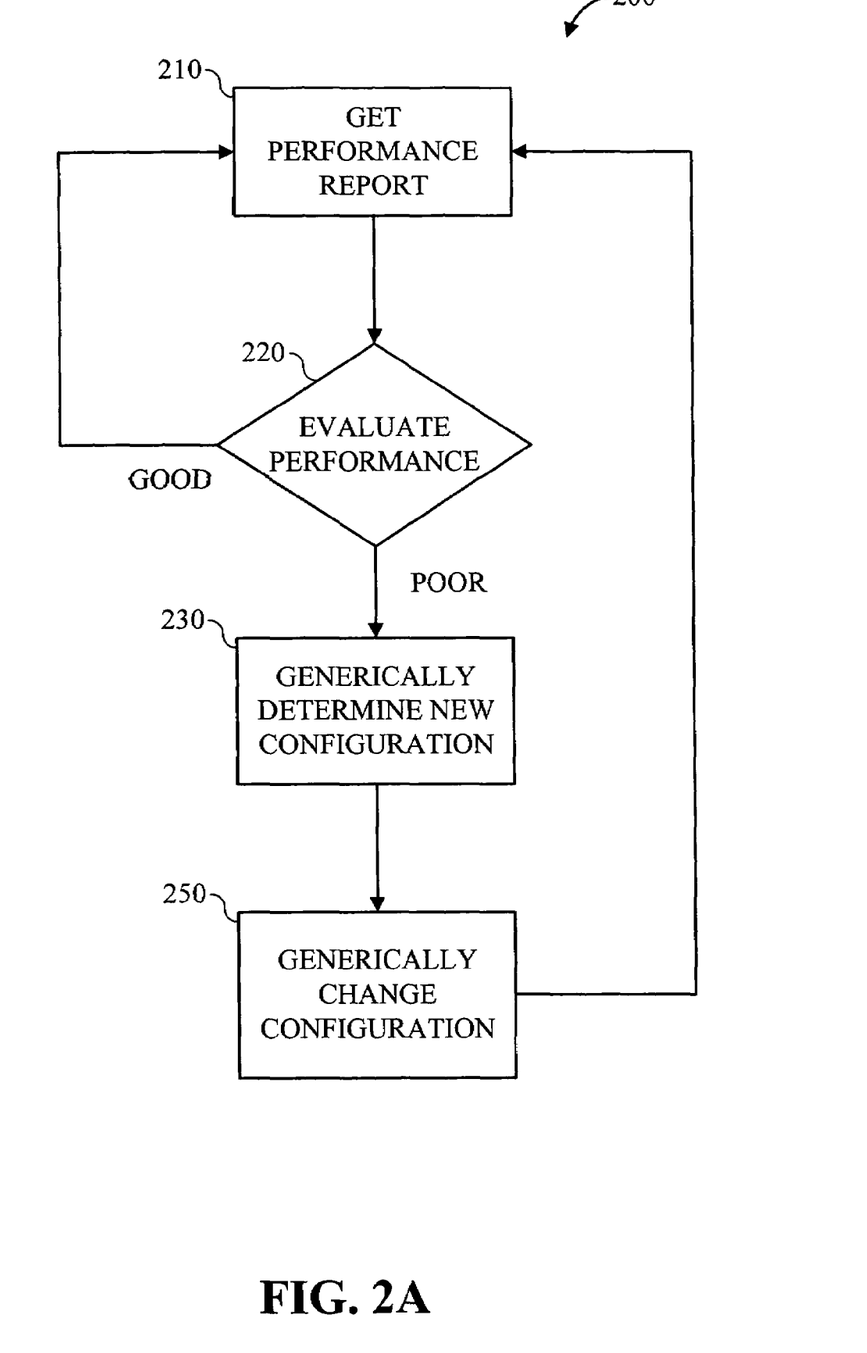
FIGS. 2A through 2F are flow diagrams illustrating a generic control methodology, according to an embodiment of the present invention.
Figure 2B:
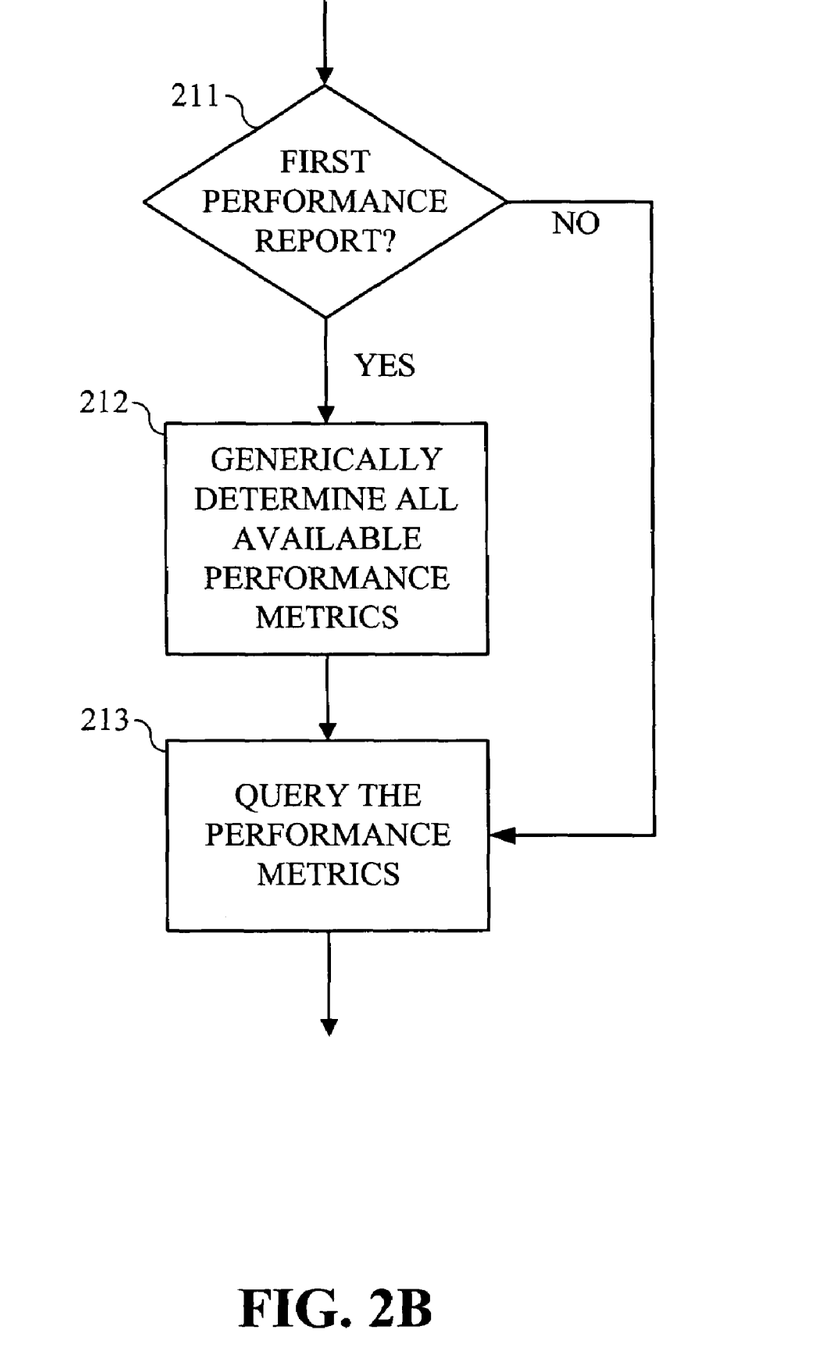

FIGS. 2A through 2F are flow diagrams that illustrate a generic control methodology, according to an embodiment of the present invention. While the overall methodology 200 is shown in FIG. 2A, details of each of the steps of FIG. 2A will be described in the context of FIGS. 2B through 2F.

Control logic 124 within controller 120 gets a performance report (step 210 of FIG. 2A) from probe 114 through the common interface (118 and 128). If this is the first performance report (step 211 of FIG. 2B) then control logic 124 requests (through generic resource interface 130 using the common interface 128 and 112 which is interpreted by that resource's translator 110) a list of performance metrics from all resources (step 212 of FIG. 2B). Each resource 108 returns through their translator 110 a list of performance metrics to control logic 124. Control logic 124 then queries each performance metric for every resource within control domain 104 (step 213 of FIG. 2B). Thus, control logic 124 has the overall system performance from probe 114 and each monitored resource 108 in the system.

Figure 2C:
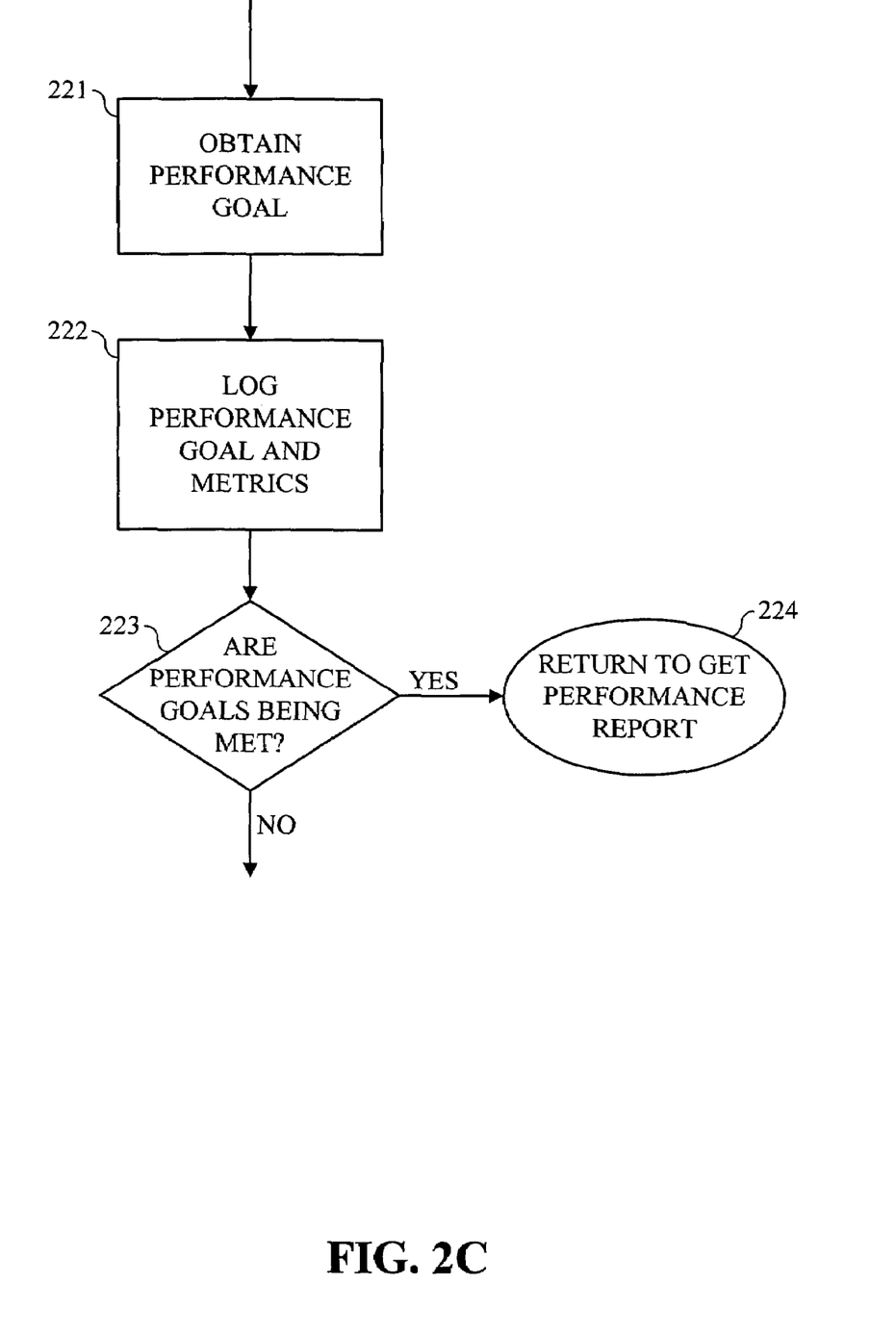

Control logic 124 then compares the system and/or individual resource performance (step 220 of FIG. 2A) to the performance goal(s) set by the administer (step 221 of FIG. 2C) and logs the performance goal(s) and metrics (step 222 of FIG. 2C). If the performance goals are being met (step 223 of FIG. 2C) then control logic 124 may wait for some period of time or immediately request another performance report (step 224 of FIG. 2C). If the goals are not being met then control logic 124 will determine a new configuration (step 230 of FIG. 2A) for any set of resources needing a change in configuration parameters to improve overall system performance.

Figure 2D:
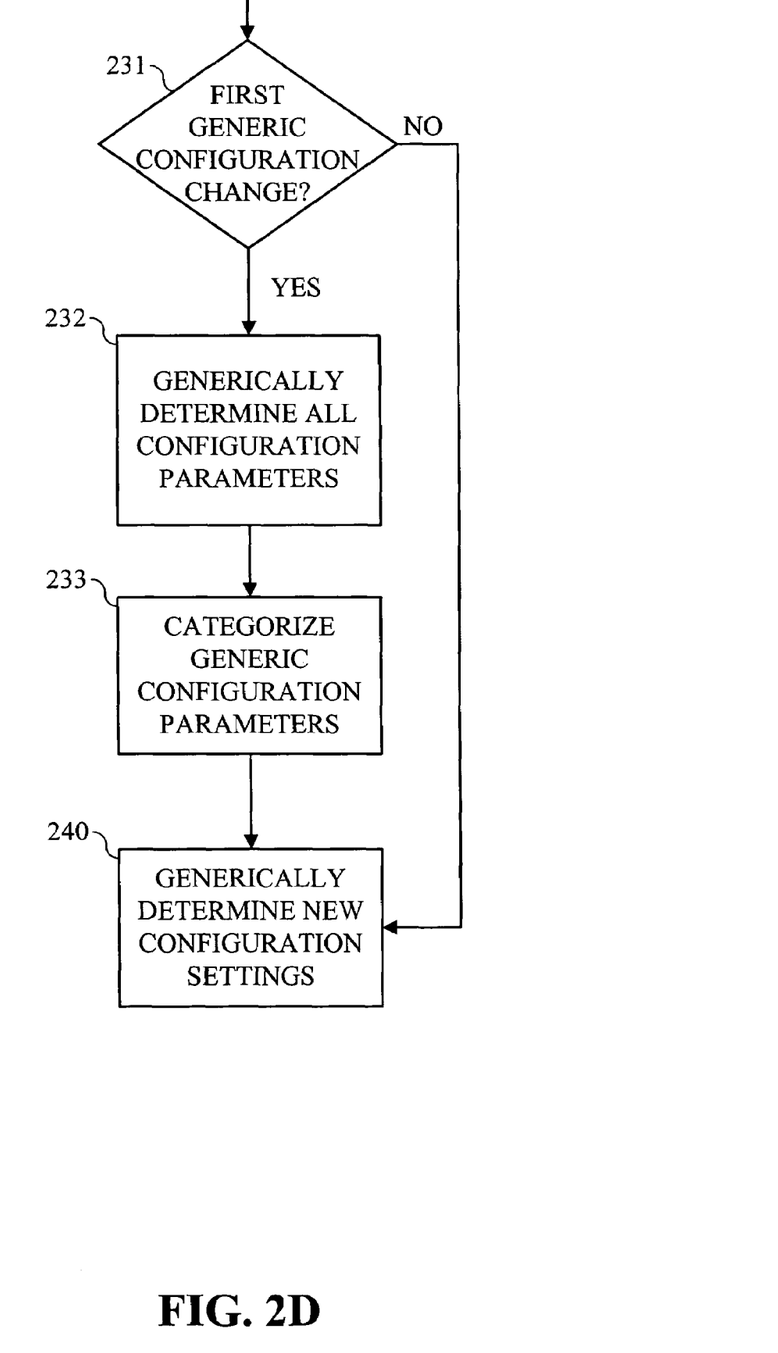
Figure 2E:
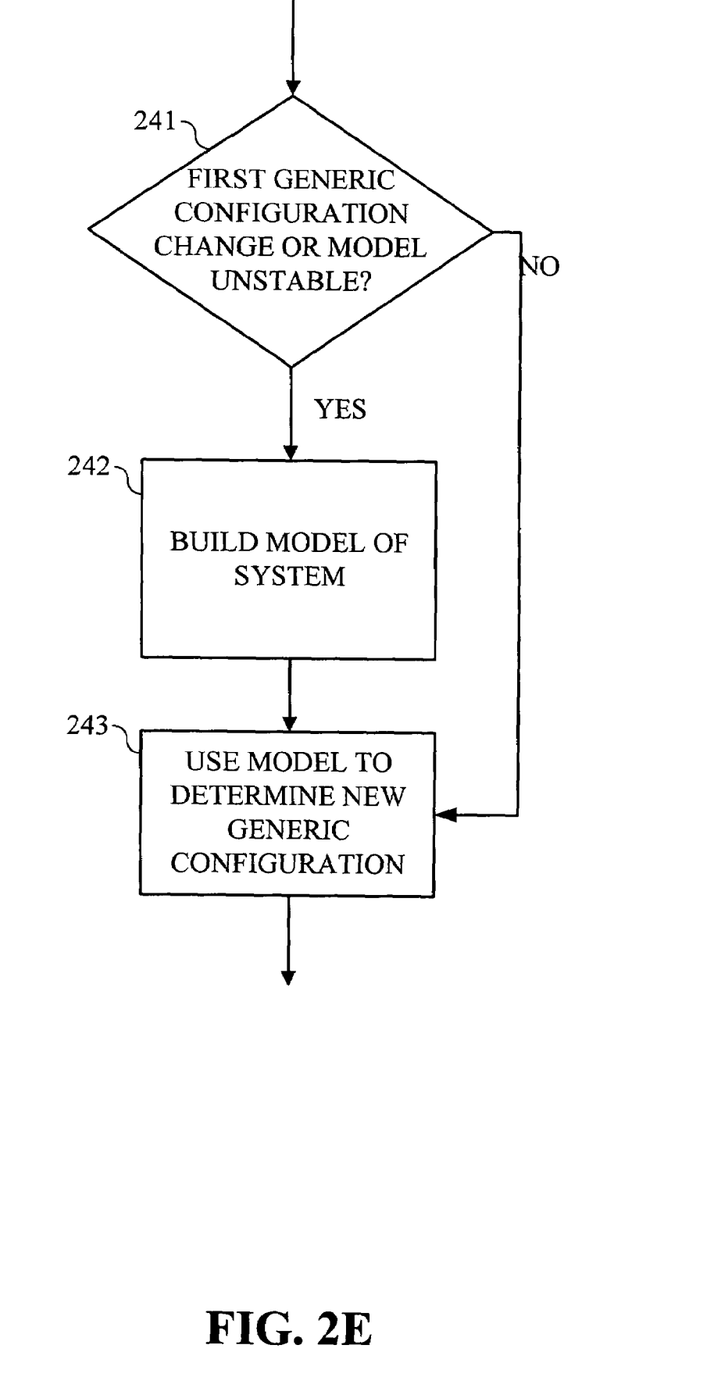
Figure 2F:
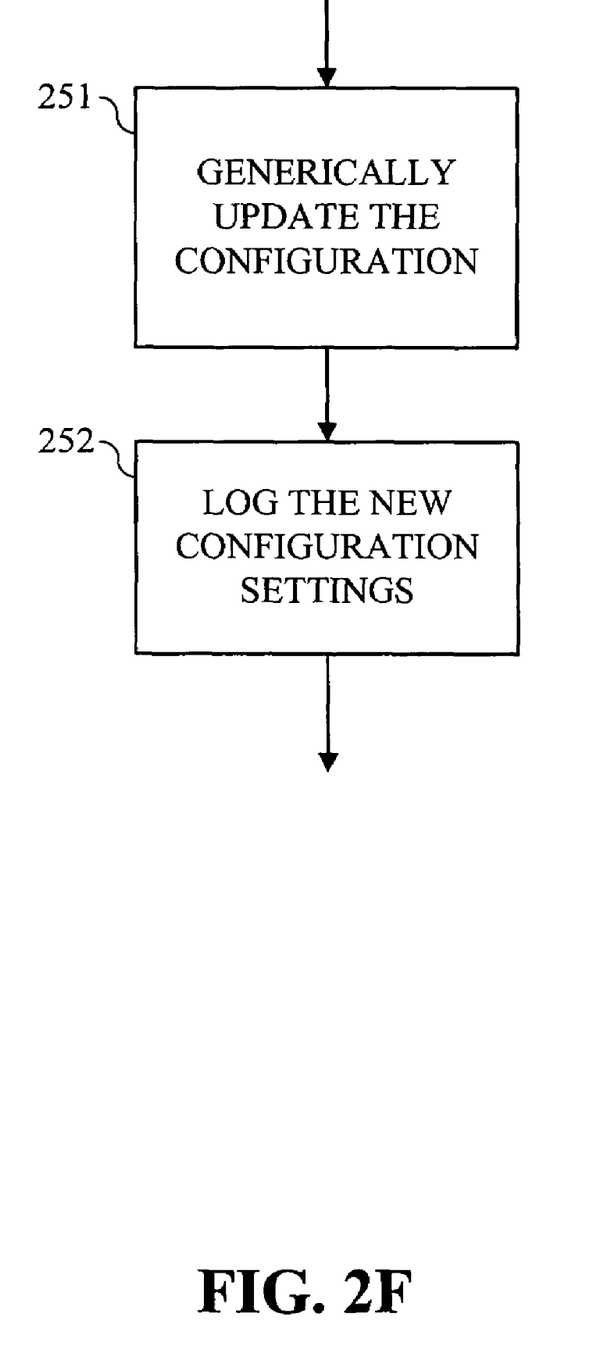

If this is the first configuration change (step 231 of FIG. 2D) then control logic 124 requests (through generic resource interface 130 using the common interface 128 and 112 which is interpreted by that resource's translator 110) a list of configuration parameters from all resources (step 232 of FIG. 2D). Each resource 108 returns through their translator 110 a list of configuration parameters to control logic 124. Generic resource interface 130 then groups (categorizes) the configuration parameters into like kinds (step 233 of FIG. 2D). For example, all memory configuration parameters may be grouped together.

Then, control logic 124 determines which configuration parameters on which resources need to be modified (step 240 of FIG. 2D). If this is the first time a change is being made to the resource parameters or if control logic 124 has determined that the previous model used to make configuration changes is no longer valid (step 241 of FIG. 2E) then control logic 124 uses the previous performance history and previous configurations to build a new model of the system (step 242 of FIG. 2E). Once the model is built, the model is used to determine the configuration settings for any or all of the generically controlled resources (step 243 of FIG. 2E).

Control logic 124 then causes the resources to change configuration (step 250 of FIG. 2A). That is, the resources are told by control logic 124 to update their configuration parameters through generic resource interface 130 using the common interface 128 and 112 which is interpreted by each resource's translator 110 (step 251). Once all of the changes are made, the new configuration is kept (logged) to build new models in the future (step 252).

3.0 Illustrative System Processes 3.1 Model Building

The generic control system of the invention uses a model of the system performance to determine which changes should be made in the resource configuration. There are many ways to build these performance models; the following is just one example.

Figure 3:
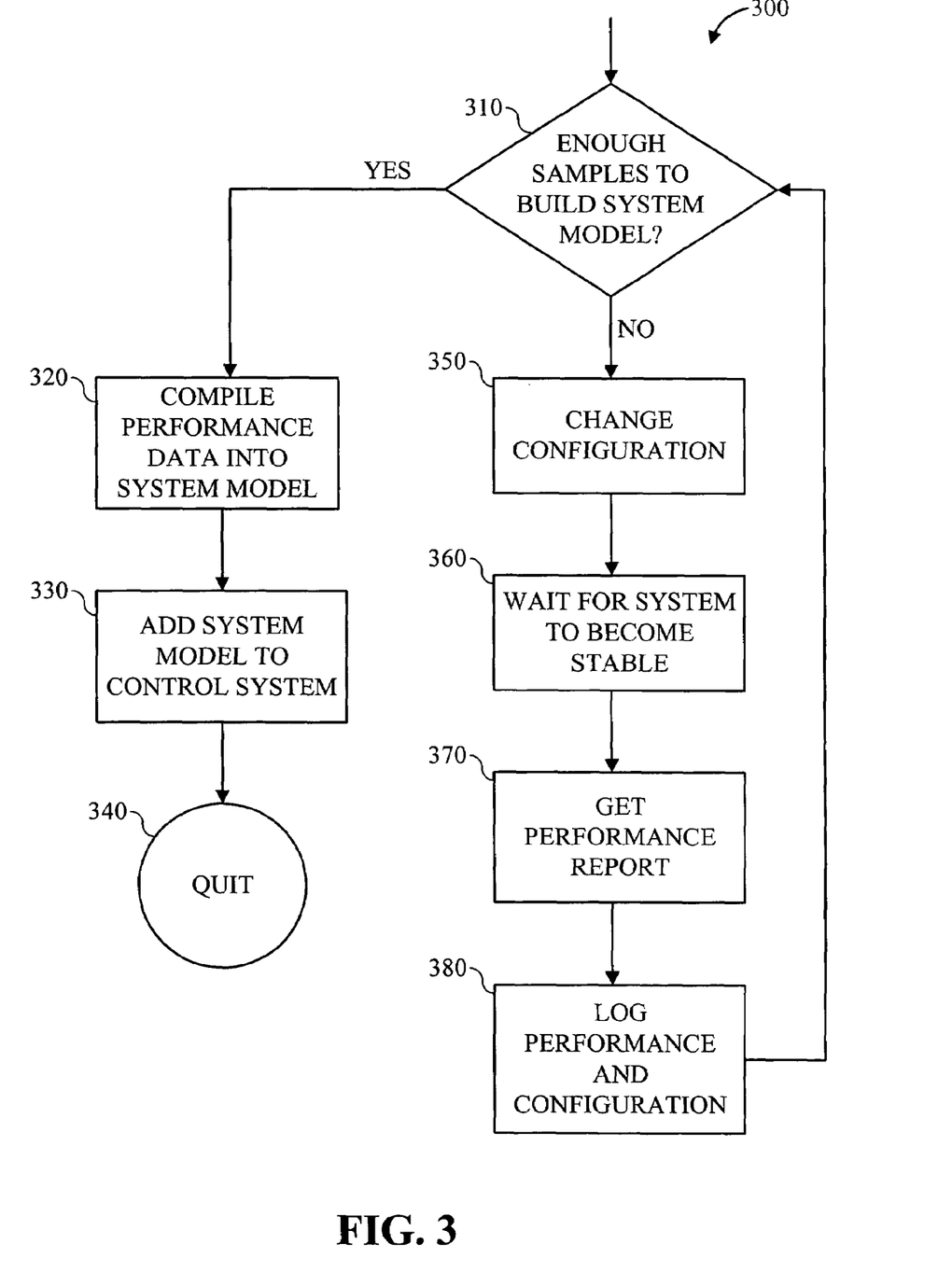
FIG. 3 is a flow diagram illustrating a model building methodology, according to an embodiment of the present invention.

FIG. 3 is a flow diagram illustrating a model building methodology according to an embodiment of the present invention. As shown, methodology 300 determines if enough samples of the system (e.g., resources 108-A through 108-D of systems 106-A and 106-B of FIG. 1) performance and their corresponding configurations have been recently collected (step 310). If yes, those samples are complied into a model of the system (step 320) and added to the generic control system (step 330). The methodology may then end (quit) at step 340. Otherwise, a dynamic change is made in the configuration of some or all of the resources (step 350) while the system is running and some period of time goes by until the system becomes stable (step 360). A performance report of the system is collected (step 370) and that report in addition to the configuration of all of the resources are kept (logged) to build the model (step 380).

3.2 Evaluate Performance Goals

Figure 4:
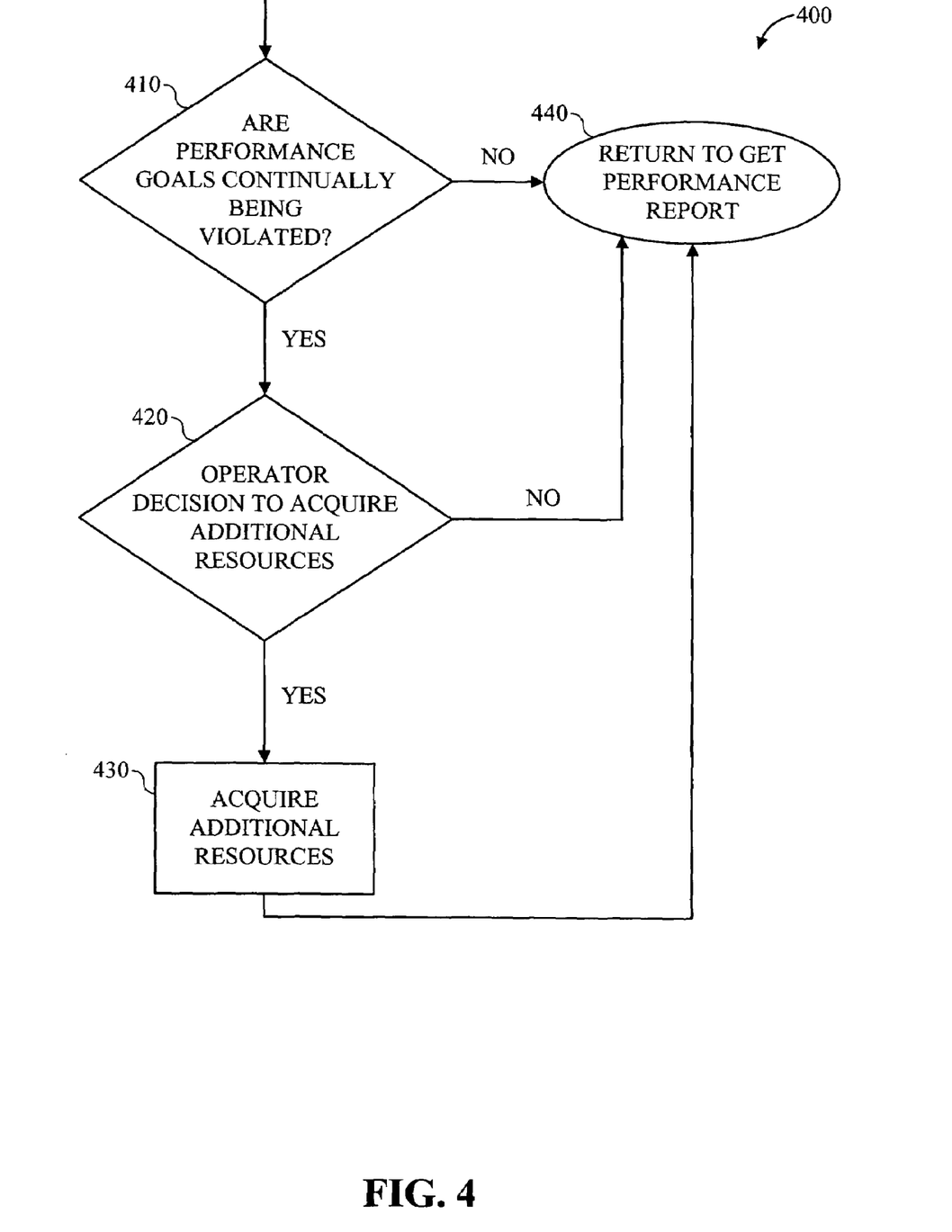
FIG. 4 is a flow diagram illustrating a performance goal evaluation methodology, according to an embodiment of the present invention.

FIG. 4 is a flow diagram illustrating a performance goal evaluation methodology according to an embodiment of the present invention. As shown, methodology 400 determines if performance goals are being achieved, and then just continues to monitor the system until those performance goals are being violated (step 410). When those goals are continually being violated the decision needs to be made whether to add additional resources to the system (step 420). This decision may be made by a system operator or administrator. Alternatively, an automated decision may also be made. If no additional resources are to be added, then the methodology continues to monitor the performance goals. Otherwise, the needed resources are added to the system (step 430). In step 440, a performance report may be obtained.

3.3 Build Resource Translators

Figure 5:
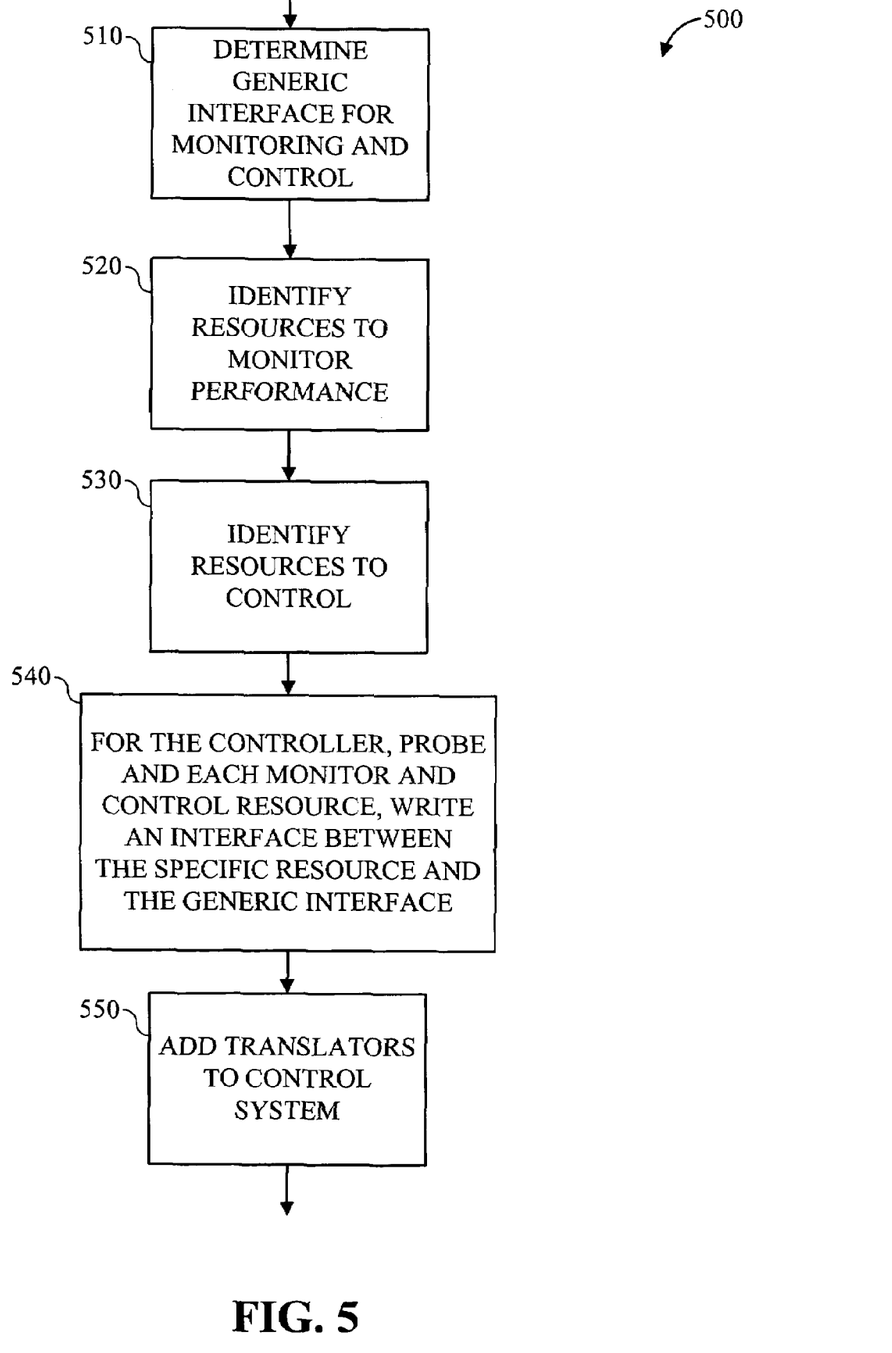
FIG. 5 is a flow diagram illustrating a resource translator building methodology, according to an embodiment of the present invention.

FIG. 5 is a flow diagram illustrating a resource translator building methodology according to an embodiment of the present invention. In accordance with methodology 500, a generic interface is determined for the control system by either starting with a common interface like the Common Interface Model (CIM) standard and extending it to allow control functions or creating an entirely new common interface for control (step 510). Either way, a common generic interface is created to allow monitoring and/or control of one or more resources.

The resources within the system that need to be monitored are identified (step 520) as well as the resources in the system that will be controlled (step 530). They do not have to be the same resources but they can be the same. Once those resources are identified, a resource translator (e.g., 110 of FIG. 1) for each resource is created to interpret the specific format and configuration parameters of those resources to the generic interface that was established for the generic control system (step 540). A translator is also built for probe 114 and controller 120. Each translator is then added to the generic control system (step 550).

4.0 Illustrative Computer System

Figure 6:
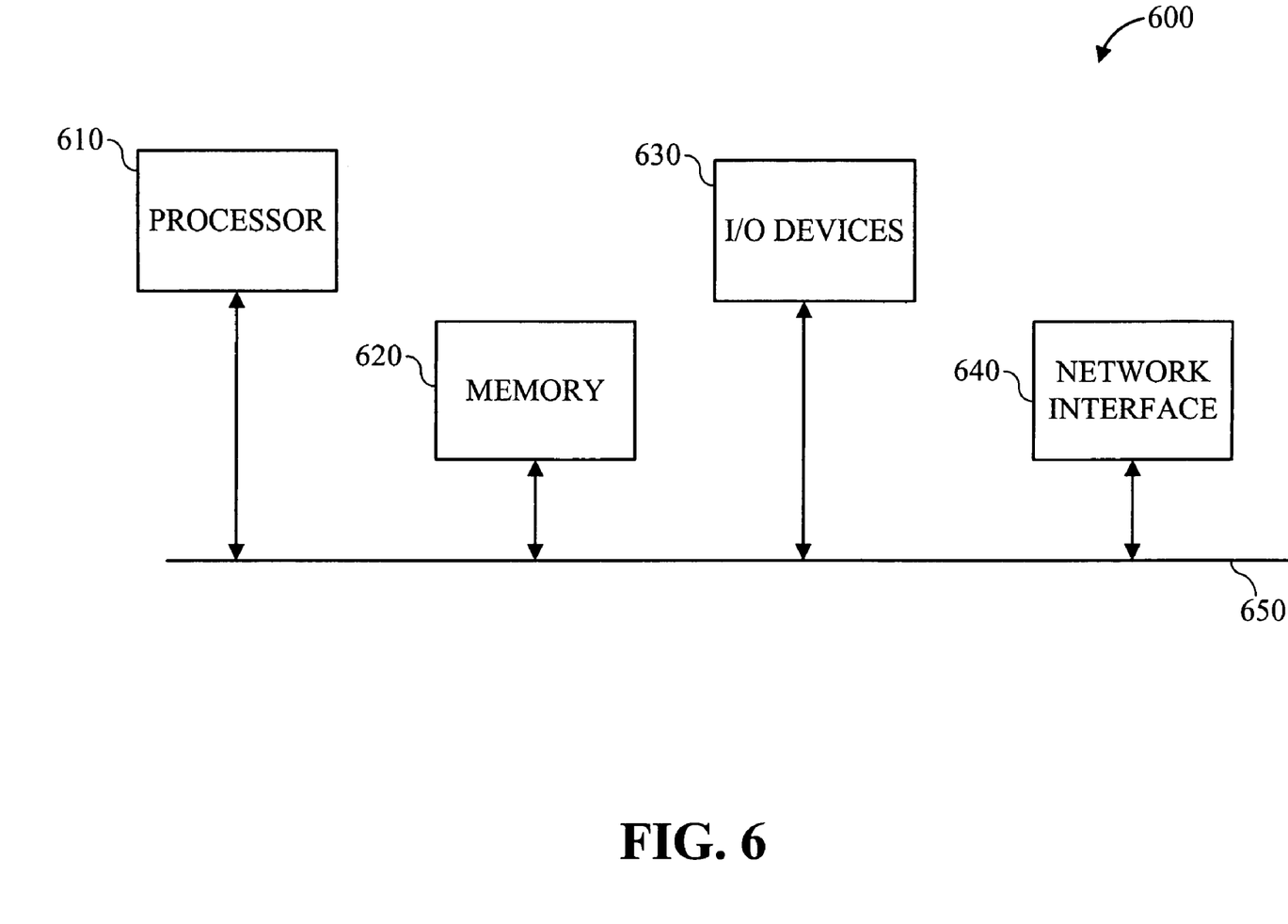
FIG. 6 is a block diagram illustrating an illustrative hardware implementation of a computer system in accordance with which one or more components of a generic control system may be implemented, according to an embodiment of the present invention.

FIG. 6 is a block diagram illustrating an illustrative hardware implementation of a computer system in accordance with which one or more components/steps of a generic control system (e.g., components/steps described in the context of FIGS. 1 through 5) may be implemented, according to an embodiment of the present invention. For example, the illustrative architecture of FIG. 6 may be used in implementing any and all of the components of controller 120, probe 114, probe translator 116, common interfaces 112, 118 and 128, resource translators 110, and even systems 106 and resources 108 themselves, as mentioned above.

Further, it is to be understood that the individual components/steps may be implemented on one such computer system, or more preferably, on more than one such computer system. In the case of an implementation on a distributed system, the individual computer systems and/or devices may be connected via a suitable network, e.g., the Internet or World Wide Web. However, the system may be realized via private or local networks. The invention is not limited to any particular network.

As shown, the computer system 600 may be implemented in accordance with a processor 610, a memory 620, I/O devices 630, and a network interface 640, coupled via a computer bus 650 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

5.0 Service Provider

It is to be further appreciated that the present invention also comprises techniques for providing generic control services.

By way of example, a service provider agrees (e.g., via a service level agreement or some informal agreement or arrangement) with a service customer or client to provide generic control services. That is, by way of one example only, the service provider may host the customer's web site and associated applications (e.g., e-commerce applications). Then, in accordance with terms of the contract between the service provider and the service customer, the service provider provides generic control services which may comprise one or more of the methodologies of the invention described herein. By way of example, this may include automatically controlling one ore more resources so as to optimize performance of such resources to the benefit of the service customer.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of using a closed loop system to generically control one or more resources associated with at least one computing system, comprising the steps of:

obtaining one or more performance metrics and one or more configurations of the one or more resources in an associated resource specific format;

automatically creating a resource translator for interpreting the associated resource specific format;

translating the one or more performance metrics and the one or more configurations from the associated resource specific format to a generic format using the automatically created resource translator such that each of the one or more resources are generically controlled, wherein a generic format comprises a common format and generically controlling the one or more resources comprises controlling the one or more resources in accordance with the common format;

evaluating one or more generically-expressed performance metrics associated with the one or more resources given one or more generically-expressed configurations of the one or more resources;

causing a change in the one or more generically-expressed configurations of the one or more resources based on the performance metric evaluating step;

translating the one or more changed configurations from the generic format to the associated resource specific format; and updating the one or more resources with the one or more changed configurations in the associated resource specific format;

wherein the one or more configurations of the one or more resources are optimized in the closed loop system formed via a combination of the first translating, evaluating, change causing, second translating and updating steps;

wherein the method further comprises obtaining the one or more generically-expressed configurations associated with the one or more resources prior to changing a configuration;

wherein the step of evaluating the one or more generically-expressed performance metrics further comprises determining whether one or more performance goals are being met based on the one or more generically-expressed performance metrics;

wherein the step of causing a change in the one or more generically-expressed configurations further comprises building a model for use in determining changes in the one or more generically-expressed configurations;

wherein the model building step comprises using at least one of a previous performance history and a previous configuration; and wherein the model building step further comprises obtaining performance samples associated with the one or more resources and their one or more current configurations.

2. The method of claim 1, wherein the one or more resources are at least one of real resources and virtual resources.

3. The method of claim 1, further comprising the step of obtaining the one or more generically-expressed performance metrics from a probe.

4. The method of claim 3, wherein the probe measures performance of the one or more resources in the context of a particular workload.

5. The method of claim 4, wherein the particular workload is a current workload.

6. The method of claim 1, further comprising the step of obtaining the one or more generically-expressed performance metrics via one or more measurements of at least a part of an end user performance experience.

7. The method of claim 1, further comprising the step of categorizing the one or more obtained, generically-expressed configurations.

8. The method of claim 1, wherein the step of causing a change in the one or more generically-expressed configurations further comprises instructing the one or more resources to change one or more configurations associated therewith.

9. The method of claim 1, further comprising the step of storing the one or more changed, generically-expressed configurations.

10. The method of claim 1, wherein the one or more performance metrics and the one or more configurations are expressed in generic formats in accordance with one or more common generic interfaces.

11. The method of claim 10, wherein a common generic interface comprises a Common Interface Model.

12. Apparatus for using a closed loop system to generically one or more resources associated with at least one computing system, comprising: p1 a memory; and at least one processor coupled to the memory and operative to: obtain one or more performance metrics and one or more configurations of the one or more resources in an associated resource specific format; automatically create a resource translator for interpreting the associated resource specific format; translate the one or more performance metrics and the one or more configurations from the associated resource specific format to a generic format using the automatically created resource translator such that each of the one or more resources are generically controlled, wherein a generic format comprises a common format and generically controlling the one or more resources comprises controlling the one or more resources in accordance with the common format; evaluate one or more generically-expressed performance metrics associated with the one or more resources given one or more generically-expressed configurations of the one or more resources; cause a change in the one or more generically-expressed configurations of the one or more resources based on the performance metric evaluating operation; translate the one or more changed configurations from the generic format to the associated resource specific format; and update the one or more resources with the one or more changed configurations in the associated resource specific format, wherein the one or more configurations of the one or more resources are optimized in the closed loop system formed via a combination of the first translating, evaluating, change causing, second translating and updating operations;

wherein the at least one processor is further operative to obtain the one or more generically-expressed configurations associated with the one or more resources prior to changing a configuration;

wherein the operation of evaluating the one or more generically-expressed performance metrics further comprises determining whether one or more performance goals are being met based on the one or more generically-expressed performance metrics;

wherein the operation of causing a change in the one or more generically-expressed configurations further comprises building a model for use in determining changes in the one or more generically-expressed configurations;

wherein the model building operation comprises using at least one of a previous performance history and a previous configuration; and wherein the model building operation further comprises obtaining performance samples associated with the one or more resources and their one or more current configurations.

13. The apparatus of claim 12, wherein the one or more resources are at least one of real resources and virtual resources.

14. The apparatus of claim 12, wherein the at least one processor is further operative to obtain the one or more generically-expressed performance metrics from a probe.

15. The apparatus of claim 12, wherein the at least one processor is further operative to obtain the one or more generically-expressed performance metrics via one or more measurements of at least a part of an end user performance experience.

16. The apparatus of claim 12, wherein the operation of causing a change in the one or more generically-expressed configurations further comprises instructing the one or more resources to change one or more configurations associated therewith.

17. The apparatus of claim 12, wherein the at least one processor is further operative to store the one or more changed, generically-expressed configurations.

18. The apparatus of claim 12, wherein the one or more performance metrics and the one or more configurations are expressed in generic formats in accordance with one or more common generic interfaces.

19. An article of manufacture for using a closed loop system to generically control one or more resources associated with at least one computing system, comprising a machine readable medium containing one or more programs which when executed implement the steps of: obtaining one or more performance metrics and one or more configurations of the one or more resources in an associated resource specific format;
    automatically creating a resource translator for interpreting the associated resource specific format;
    translating the one or more performance metrics and the one or more configurations from the associated resource specific format to a generic format using the automatically created resource translator such that each of the one or more resources are generically controlled, wherein a generic format comprises a common format and generically controlling the one or more resources comprises controlling the one or more resources in accordance with the common format;
    evaluating one or more generically-expressed performance metrics associated with the one or more resources given one or more generically-expressed configurations of the one or more resources;
    causing a change in the one or more generically-expressed configurations of the one or more resources based on the performance metric evaluating step;
    translating the one or more changed configurations from the generic format to the associated resource specific format; and
    updating the one or more resources with the one or more changed configurations in the associated resource specific format;
    wherein the one or more configurations of the one or more resources are optimized in the closed loop system formed via a combination of the first translating, evaluating, change causing, second translating and updating steps;
    wherein the one or more programs when executed implement the further step of obtaining the one or more generically-expressed configurations associated with the one or more resources prior to changing a configuration;
    wherein the step of evaluating the one or more generically-expressed performance metrics further comprises determining whether one or more performance goals are being met based on the one or more generically-expressed performance metrics;
    wherein the step of causing a change in the one or more generically-expressed configurations further comprises building a model for use in determining changes in the one or more generically-expressed configurations;
    wherein the model building step comprises using at least one of a previous performance history and a previous configuration; and
    wherein the model building step further comprises obtaining performance samples associated with the one or more resources and their one or more current configurations.

20. A method of providing a service for using a closed loop system to generically control one or more resources associated with at least one computing system, comprising the step of:
    a service provider deploying a system operative to: obtain one or more performance metrics and one or more configurations of the one or more resources in an associated resource specific format; automatically create a resource translator for interpreting the associated resource specific format; translate one or more performance metrics and one or more configurations from an associated resource specific format to a generic format using the automatically created resource translator such that each of the one or more resources are generically controlled, wherein a generic format comprises a common format and generically controlling the one or more resources comprises controlling the one or more resources in accordance with the common format; evaluate one or more generically-expressed performance metrics associated with the one or more resources given one or more generically-expressed configurations of the one or more resources; cause a change in the one or more generically-expressed configurations of the one or more resources based on the performance metric evaluating step; translate the one or more changed configurations from the generic format to the associated resource specific format; and update the one or more resources with the one or more changed configurations in the associated resource specific format, wherein the one or more configurations of the one or more resources are optimized in the closed loop system formed via a combination of the first translating, evaluating, change causing, second translating and updating operations;
    wherein the system is further operative to obtain the one or more generically-expressed configurations associated with the one or more resources prior to changing a configuration;
    wherein the operation of evaluating the one or more generically-expressed performance metrics further comprises determining whether one or more performance goals are being met based on the one or more generically-expressed performance metrics;
    wherein the operation of causing a change in the one or more generically-expressed configurations further comprises building a model for use in determining changes in the one or more generically-expressed configurations;
    wherein the model building operation comprises using at least one of a previous performance history and a previous configuration; and
    wherein the model building operation further comprises obtaining performance samples associated with the one or more resources and their one or more current configurations.

* * * * *